US006577649B1

United States Patent
Leibowitz et al.

(10) Patent No.: US 6,577,649 B1
(45) Date of Patent: Jun. 10, 2003

(54) MULTIPLEXER FOR ASYNCHRONOUS DATA

(75) Inventors: Moshe Leibowitz, Haifa (IL); Israel Wagner, Haifa (IL); Uri Elazar, Alon Hagalil (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,956

(22) Filed: Nov. 12, 1999

(51) Int. Cl.[7] .................................................. H04J 3/06
(52) U.S. Cl. ....................................... 370/503; 370/537
(58) Field of Search ............................... 370/503, 507, 370/516, 517, 518, 519, 537; 375/354, 356, 355

(56) References Cited

U.S. PATENT DOCUMENTS

| | | | | |
|---|---|---|---|---|
| 3,824,543 A | * | 7/1974 | Cichetti, Jr. .................. | 370/503 |
| 5,268,932 A | * | 12/1993 | Okuzono ..................... | 375/354 |
| 5,278,456 A | | 1/1994 | Béchade et al. | |
| 5,488,639 A | | 1/1996 | Mac Williams et al. | |

* cited by examiner

Primary Examiner—Chau Nguyen
Assistant Examiner—Scott Waite
(74) Attorney, Agent, or Firm—Darby & Darby (57) ABSTRACT

Apparatus for multiplexing electronic data-words provided by a plurality of input sources operating in accordance with respective input clocks which may be mutually asynchronous. The data-words are multiplexed to a common output operating in accordance with a system clock. The apparatus includes delay circuitry, which generates a plurality of select signals responsive to the system clock, corresponding respectively to the plurality of input sources. The apparatus also includes a plurality of synchronizers respectively associated with the plurality of input sources, each synchronizer including a series of memory buffers through which data-words from the respective input source are transferred. The series of memory buffers includes at least an input buffer, which receives the data-words from the respective input source in accordance with the respective input clock, and an output buffer, which provides the data-words for output in accordance with the corresponding select signal. The apparatus further includes a multiplexer which receives the data-words from the output buffers of the plurality of synchronizers responsive to the respective select signals, and which combines the data-words into the common output in accordance with the system clock.

19 Claims, 5 Drawing Sheets

MULTIPLEXER FOR ASYNCHRONOUS DATA

FIELD OF THE INVENTION

The present invention relates generally to multiplexing data, and specifically to multiplexing asynchronous data into a synchronous format.

BACKGROUND OF THE INVENTION

Speed capabilities of data networks are constantly increasing, and today Gigabit Ethernet networks, operating at 1 Gbps, are commercially available. In many cases, for example, where there is an existing lower-speed network in place, upgrading an existing network and all the existing infrastructure of the network involves considerable outlay in terms of time and money. To upgrade a network completely may involve, inter alia, changing network cabling, changing interface hardware devices between the cabling and existing computers, and changing hardware devices within hubs of the network. There is therefore a need for inexpensive hardware devices that can be used to interface between older, existing low-speed networks and new higher-speed networks.

Networks such as Fast Ethernet and Gigabit Ethernet networks are based on transferring data through the networks in the form of packets, wherein each packet comprises no more than a known packet size, expressed in terms of data-words. Between successive packets is a period of time, defined by a network protocol, during which data are not transferred. Fast Ethernet networks typically interface with physical media with 4 bit data-words, known as nibbles, in packets of up to 3036 nibbles, the nibbles being clocked at a nominal 25 MHz thereby transferring data at a nominal 100 Mbps. Gigabit Ethernet networks typically operate in packets of up to 1518 bytes, the bytes being clocked at a nominal 125 MHz, thereby transferring data at a nominal 1 Gbps. Clocks which are used to transfer the data within the network, while nominally of a fixed frequency, are allowed to vary in frequency by a permitted tolerance. Thus, for Fast Ethernet networks the permitted clock frequencies are 25 MHz ±0.01%, and for Gigabit Ethernet networks the permitted frequencies are 125 MHz ±0.01%.

Problems associated with clock rate differences within networks are well known in the art. For example, clock recovery from received data is a recognized method for generating a clock synchronous with the data. Other methods for generating a synchronous clock from an asynchronous clock, or for producing a clock signal of a specific shape and duty cycle from an arbitrarily-shaped input clock, are also known in the art.

U.S. Pat. No. 5,278,456, to Bechade et al., whose disclosure is incorporated herein by reference, describes a process for generating a clock signal with a specific duty cycle from an input clock signal with a variable duty cycle. The generated clock signal is synchronous with the input clock signal, so that the signals have exactly the same frequency.

U.S. Pat. No. 5,488,639, to MacWilliams et al., whose disclosure is incorporated herein by reference, describes a method for synchronizing an asynchronous signal, such as a read signal, to a reference clock signal. The method relates to synchronizing the phase of the asynchronous signal with the phase of the reference clock signal.

SUMMARY OF THE INVENTION

It is an object of some aspects of the present invention to provide methods and apparatus for synchronizing asynchronous packets of data.

It is a further object of some aspects of the present invention to provide methods and apparatus for multiplexing asynchronous packets of data from a plurality of sources.

In preferred embodiments of the present invention, a multiplexer feeds data from a plurality of electronic data-word sources, operating at low data rates, into a common line of a high data-rate network. The sources typically provide packets of data-words at a common data-rate, for example at 100 Mbps, from respective low data-rate networks, but operate asynchronously with respect to one another. The term data-word is to be understood herein as comprising any integral number of bits of data. The multiplexer combines the data-words and feeds the combination to a high data-rate interface as a synchronous data stream, for example, at 1 Gbps. The high data-rate interface then feeds the combination as packets into the high data-rate network. In order to multiplex the asynchronous data received from the plurality of sources, the data-words from each source are fed through a respective series of latches, which act as storage buffers. The latches in each series are clocked so that the data-words are available for multiplexing at an output latch in the series in the required synchronization for multiplexing at the high data rate, despite the asynchrony of the low data-rate clocks and drift between the different clocks, and substantially without loss of data-words in the multiplexing process.

Multiplexing the outputs of the plurality of low data-rate sources into the high data-rate network has a number of advantages:

The high data-rate network can be installed in addition to the existing low data-rate network, and the infrastructure of the low data-rate network can continue to be used.

By using one multiplexer to feed data from the plurality of generators into the high data-rate network, overall pin count in an interface between the sources and the high data-rate network is substantially reduced compared to the pin count which would be needed if separate interfaces were used for the different sources.

In some preferred embodiments of the present invention, data from the plurality of sources is generated initially as data-words of 4 bits, and the 4-bit data-words are combined into bytes of 8 bits in a first latch. Two or more subsequent latches are used as described above to buffer and then synchronize the bytes to the high data rate.

There is therefore provided, in accordance with a preferred embodiment of the present invention, apparatus for multiplexing electronic data-words provided by a plurality of input sources operating in accordance with respective input clocks, which may be mutually asynchronous, to a common output operating in accordance with a system clock, the apparatus including:

delay circuitry, which generates a plurality of select signals responsive to the system clock, corresponding respectively to the plurality of input sources;

a plurality of synchronizers respectively associated with the plurality of input sources, each synchronizer including a series of memory buffers through which data-words from the respective input source are transferred, the series of memory buffers including at least:

an input buffer, which receives the data-words from the respective input source in accordance with the respective input clock; and an output buffer, which provides the data-words for output in accordance with the corresponding select signal; and a multiplexer which receives the data-words from the output buffers of the plurality of synchronizers responsive to the respective select signals, and which combines the data-words into the common output in accordance with the system clock.

Preferably, each series of memory buffers includes an intermediate buffer which receives the data-words from the corresponding input buffer and which transfers the data-words to the corresponding output buffer responsive to the corresponding select signal.

Preferably, the intermediate buffer transfers the data-words to the corresponding output buffer at a time determined by a corresponding intermediate phase which is a function of a phase of the corresponding select signal and a phase of the corresponding input clock.

Preferably, the corresponding intermediate phase is a mean of the phase of the corresponding select signal and the phase of the corresponding input clock when a difference between the phase of the corresponding select signal and the phase of the corresponding input clock is greater than or equal to 180°, and the corresponding intermediate phase is the mean plus 180° when the difference between the phase of the corresponding select signal and the phase of the corresponding input clock is less than 180°.

Further preferably, each synchronizer includes a controller which generates respective clock signals to control transfer of the data-words from the corresponding input buffer and the corresponding intermediate buffer and the corresponding output buffer responsive to the corresponding select signal and the corresponding input clock and the system clock.

Preferably, the delay circuitry generates a sequence of synchronizing pulses each of which is applied to the plurality of synchronizers during a time period when the data-words are not being received from the output buffers, so as to zero out clock drift.

Preferably, the delay circuitry generates the synchronizing pulses within a period which is a function of a nominal asynchrony of the plurality of input clocks, so that the output data-words and corresponding input data-words differ in phase by no more than a predetermined maximum phase deviation.

Further preferably, the multiplexer is coupled to transfer the common output to a packet-switched network, and the sequence of synchronizing pulses is generated responsive to a packet synchronization signal in the network.

Preferably, the common output includes an output which operates in accordance with a Gigabit Ethernet standard, and the plurality of input sources includes at least some input sources which operate in accordance with a Fast Ethernet standard.

Preferably, each of the synchronizers that is coupled to receive input in accordance with the Fast Ethernet standard includes a data assembly buffer, in which two four-bit data-words are combined into one eight-bit data-word for output in accordance with the. Gigabit Ethernet standard.

Further preferably, the plurality of select signals includes a sequence of select signals such that a respective select signal in the sequence is provided to each of the plurality of synchronizers.

Preferably, the memory buffers include latches arranged to transfer data from one to another in sequence and mutually clocked so that each data-word received by a given one of the latches is transferred to the next latch in the sequence before the given latch receives the next data-word.

There is further provided, in accordance with a preferred embodiment of the present invention, a method for multiplexing a plurality of electronic data-words provided by a plurality of input sources operating in accordance with respective input clocks, which may be mutually asynchronous, to a common output operating in accordance with a system clock, the method including:

generating a plurality of select signals responsive to the system clock, corresponding respectively to the plurality of input sources;

receiving the data-words from the input source in respective input buffers in accordance with the respective input clocks;

conveying the data-words in the input buffers to corresponding output buffers such that the data-words are available for output from the output buffers in accordance with the respective select signals; and multiplexing the data-words from the output buffers responsive to the select signals so as to provide the common output responsive to the system clock.

Preferably, conveying the data-words includes conveying the data-words from the input buffers to respective intermediate buffers which transfer the data-words to the corresponding output buffers responsive to the respective select signals.

Preferably, conveying the data-words includes generating an intermediate clock phase at which the data-words are to be transferred by the intermediate buffers as a mean of a phase of the corresponding select signal and a phase of the corresponding input clock when a difference between the phase of the corresponding select signal and the phase of the corresponding input clock is greater than or equal to 180°, and generating each of the corresponding phases as the mean plus 180° when the difference between the phase of the corresponding select signal and the phase of the corresponding input clock is less than 180°.

Preferably, the method includes generating a sequence of synchronizing pulses each of which is applied to the plurality of synchronizers during a time period when the data-words are not being received from the output buffers, so as to zero out clock drift.

Further preferably, generating the sequence of synchronizing pulses includes generating the pulses with a period which is a function of a nominal asynchrony of the plurality of input clocks, so that the output data-words and corresponding input data-words differ in phase by no more than a predetermined maximum phase deviation.

Preferably, multiplexing the data-words includes outputting the data-words in accordance with a Gigabit Ethernet standard, and receiving the data-words includes receiving the data-words from at least some input sources operating in accordance with a Fast Ethernet standard.

Preferably, generating the plurality of select signals includes generating a sequence of select signals such that a respective select signal in the sequence is provided to each of the plurality of synchronizers.

The present invention will be more fully understood from the following detailed description of the preferred embodiments thereof, taken together with the drawings, in which:

DETAILED DESCRIPTION OF PREFERRED EMBODIMENTS

Figure 1:
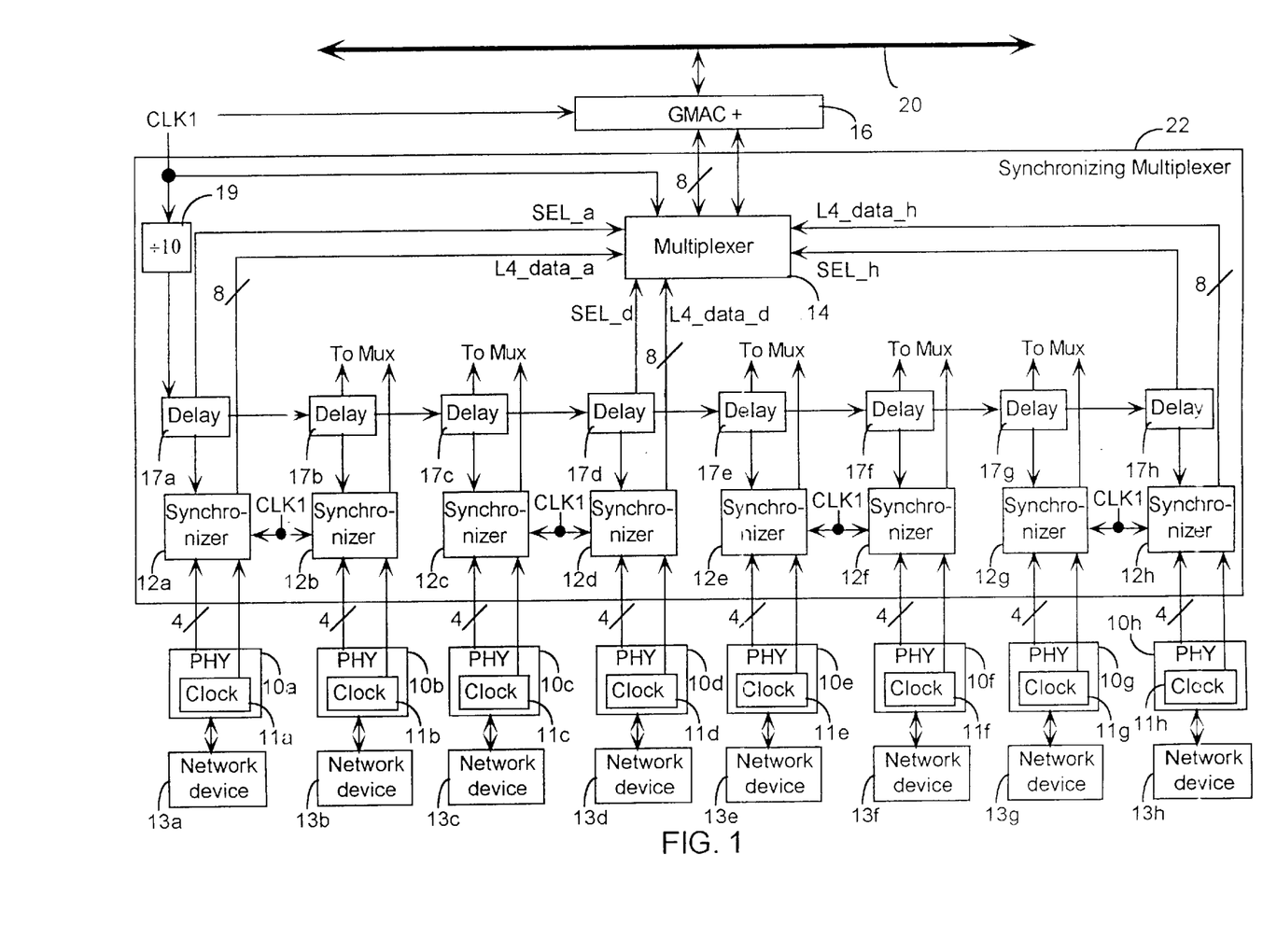
FIG. 1 is a schematic block diagram of a synchronizing multiplexer system, according to a preferred embodiment of the present invention.

Reference is now made to FIG. 1, which is a schematic block diagram showing the operation of a synchronizing multiplexer system 22, according to a preferred embodiment of the present invention. A plurality of physical layer interfaces 10a, 10b, 10c, 10d, 10e, 10f, 10g, and 10h operate as respective data packet sources, each source conveying packets of no more than a preset number of data-words of 4 bits each, to system 22. The preset number of data-words is herein termed a packet size. Interfaces 10a, 10b, 10c, 10d, 10e, 10f, 10g, and 10h are functionally substantially identical in the present embodiment, and for convenience are referred to commonly hereinafter as interface 10. While the number of sources in the preferred embodiment described herein is eight, it will be appreciated that this number is chosen as an example, and other numbers of generators may be used to input data packets to system 22.

Most preferably, system 22 is implemented as a custom integrated circuit by methods known in the art. Alternatively, system 22 is implemented as a combination of discrete devices, or as a semi-custom device, or as a combination of custom and/or semi-custom and/or discrete devices.

Each physical interface 10 operates in accordance with a respective interface clock 11a, 11b, 11c, 11d, 11e, 11f, 11g, or 11h (hereinafter referred to commonly as clock 11). Each interface clock preferably runs independently at a rate of 25±0.01% MHz, corresponding to the rate for Fast Ethernet networks, so that in general the clocks will run asynchronously. Even when the clocks happen to be at the same frequency, the phases of each of the clocks are generally independent of one another. Preferably, each physical interface 10 receives data from a respective network device 13a, 13b, 13c, 13d, 13e, 13f, 13g, or 13h (hereinafter device 13), operating on one or more low-data-rate networks such as a Fast Ethernet network. Each physical interface 10 is coupled to convey the data to a respective synchronizer 12a, 12b, 12c, 12d, 12e, 12f, 12g, or 12h (hereinafter synchronizer 12) comprised in system 22.

Each synchronizer 12 receives sequences of 4-bit data-words from its respective physical interface 10, and combines pairs of 4-bit data-words to generate 8-bit bytes. As explained in more detail below, each synchronizer 12 buffers and synchronizes the generated bytes to an external system clock, preferably operating at 125 MHz. Most preferably, the synchronized bytes are clocked cyclically in a round-robin manner from the separate synchronizers into a multiplexer 14. Alternatively, the synchronized bytes are clocked by some other sequential method into multiplexer 14. The sequential clocking is performed using respective select clock signals SEL_a, SEL_b, SEL_c, SEL_d, SEL_e, SEL_f, SEL_g, and SEL_h, preferably derived from an external system clock CLK1 via a divide-by-10 circuit 19, with respective, cumulative delays 17a, 17b, 17c, 17d, 17e, 17f, 17g, and 17h. Alternatively, one or more other delay devices, as are known in the art, provide the respective select clock signals. The synchronized bytes are then clocked sequentially, using the external system clock, to a high data-rate interface 16 such as a Gigabit Memory Access Controller (GMAC) modified to receive the bytes, which is thus able to receive data from a plurality of different low data-rate network devices. The high data-rate interface inputs the synchronized data to a high data-rate network 20, most preferably a Gigabit Ethernet network.

Figure 2:
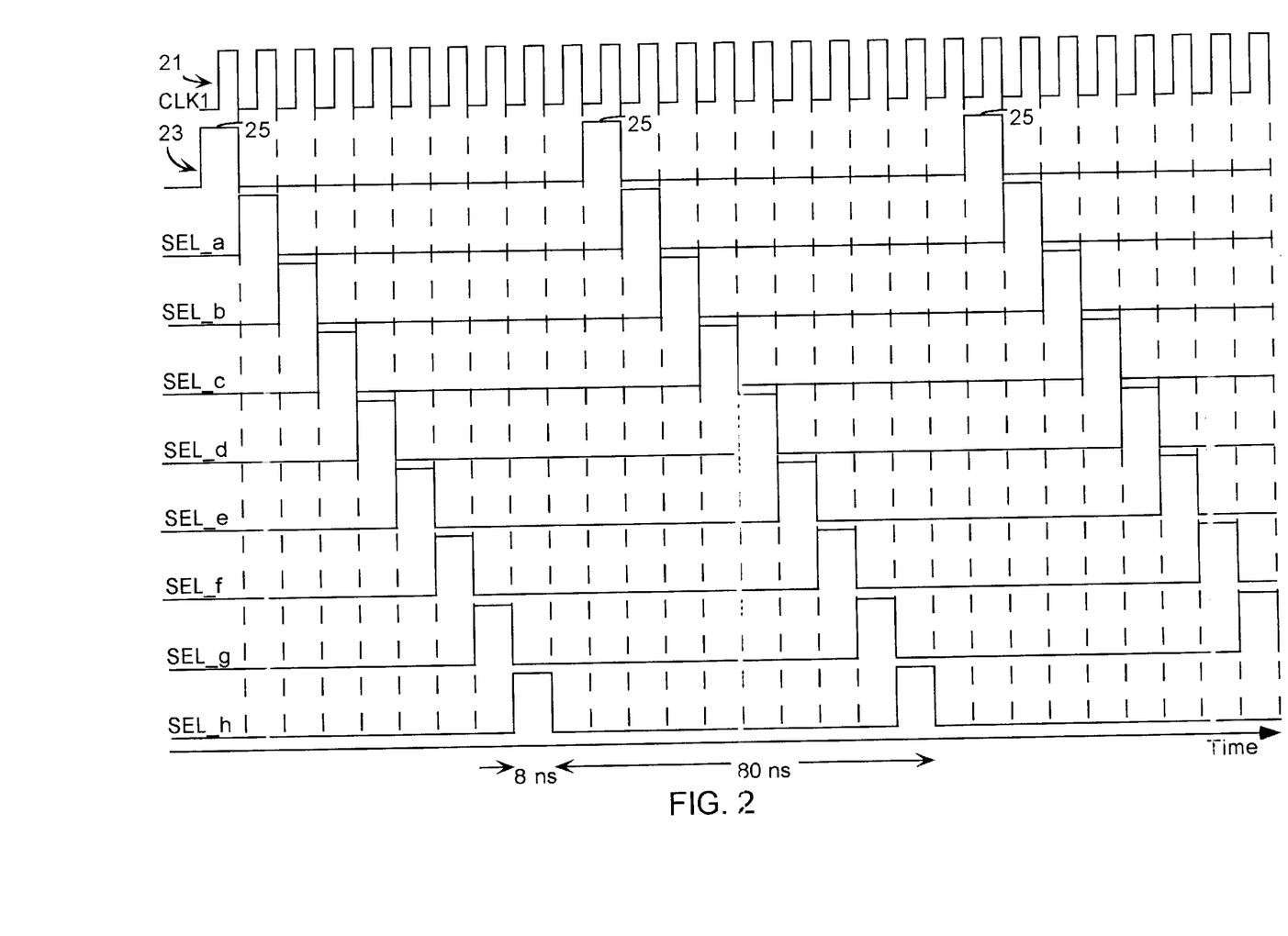
FIG. 2 is a schematic timing diagram showing clock signals used in the system of FIG. 1, according to a preferred embodiment of the present invention.

FIG. 2 is a schematic timing diagram showing select clock signals used in system 22, according to a preferred embodiment of the present invention. An external system clock signal 21, preferably having a frequency of 125 MHz, is input to divide-by-10 circuit 19. The external system clock signal is also termed CLK1 hereinbelow. Circuit 19 generates a select signal 23, having a period of 80 ns and a select time 25 of 8 ns when the select signal is high. Select signal 23 is input to delay 17a, which generates select signal SEL_a, delayed by 8 ns from signal 23. Select signal SEL_a is input to multiplexer 14 and to synchronizer 12a so that multiplexer 14 is able to select signals from synchronizer 12a when SEL_a is high. SEL_a is also input to delay 17b to generate select signal SEL_b, delayed by 8 ns from SEL_a. As in the case of SEL_a, SEL_b is input to multiplexer 14 and to synchronizer 12b so that multiplexer 14 is able to select signals from synchronizer 12b when SEL_b is high. Select signals SEL_c, SEL_d, SEL_e, SEL_f, SEL_g, and SEL_h, each delayed by 8 ns from the respective preceding select signal, are generated substantially as described above for select signals SEL_a and SEL_b, and are input to multiplexer 14 and the respective synchronizers. Thus, at any instant in time, multiplexer 14 is able to accept data from only one of synchronizers 12a, 12b, 12c, 12d, 12e, 12f, 12g, or 12h.

As explained in the Background of the Invention, networks such as Fast Ethernet and Gigabit Ethernet networks transfer data in the form of packets. For Gigabit Ethernet networks, the maximum packet size is 1518 bytes. Clocks which are used to control data transfer may vary in frequency by a permitted tolerance, equal to ±0.01% of the nominal clock rate for both of these types of network. Once in every packet, a synchronizing pulse is applied in order to zero out any clock drift that may have arisen. The finite packet size and the permitted clock tolerance mean that for any two packets of data-words, there is a maximum possible phase deviation between the packets of 1518×0.02%= 30.36%. The fact that a maximum possible phase deviation exists is utilized in system 22 in order to synchronize data within each synchronizer 12.

Figure 3:
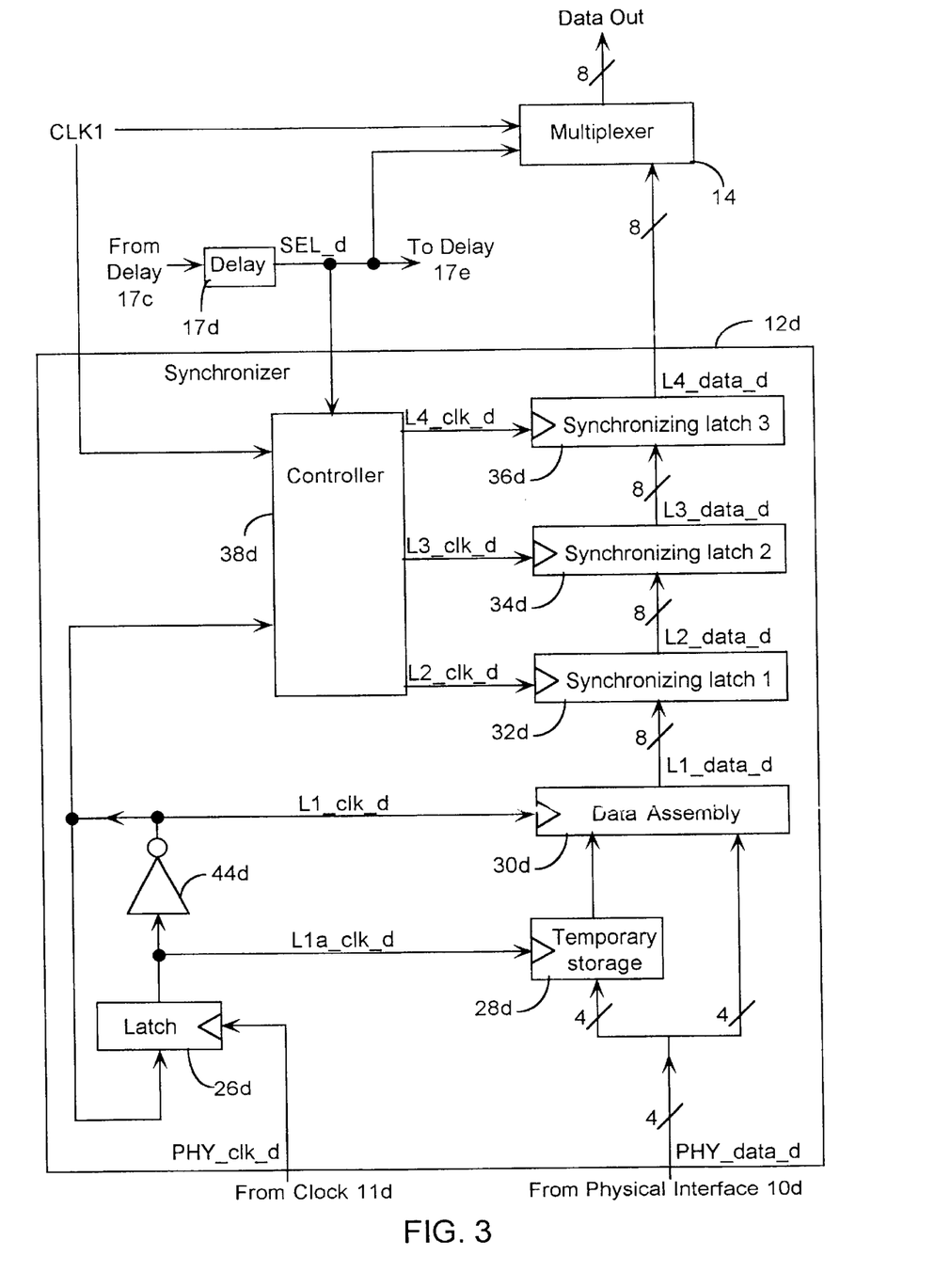
FIG. 3 is a schematic block diagram of a synchronizer in the system of FIG. 1, according to a preferred embodiment of the present invention.
Figure 4:
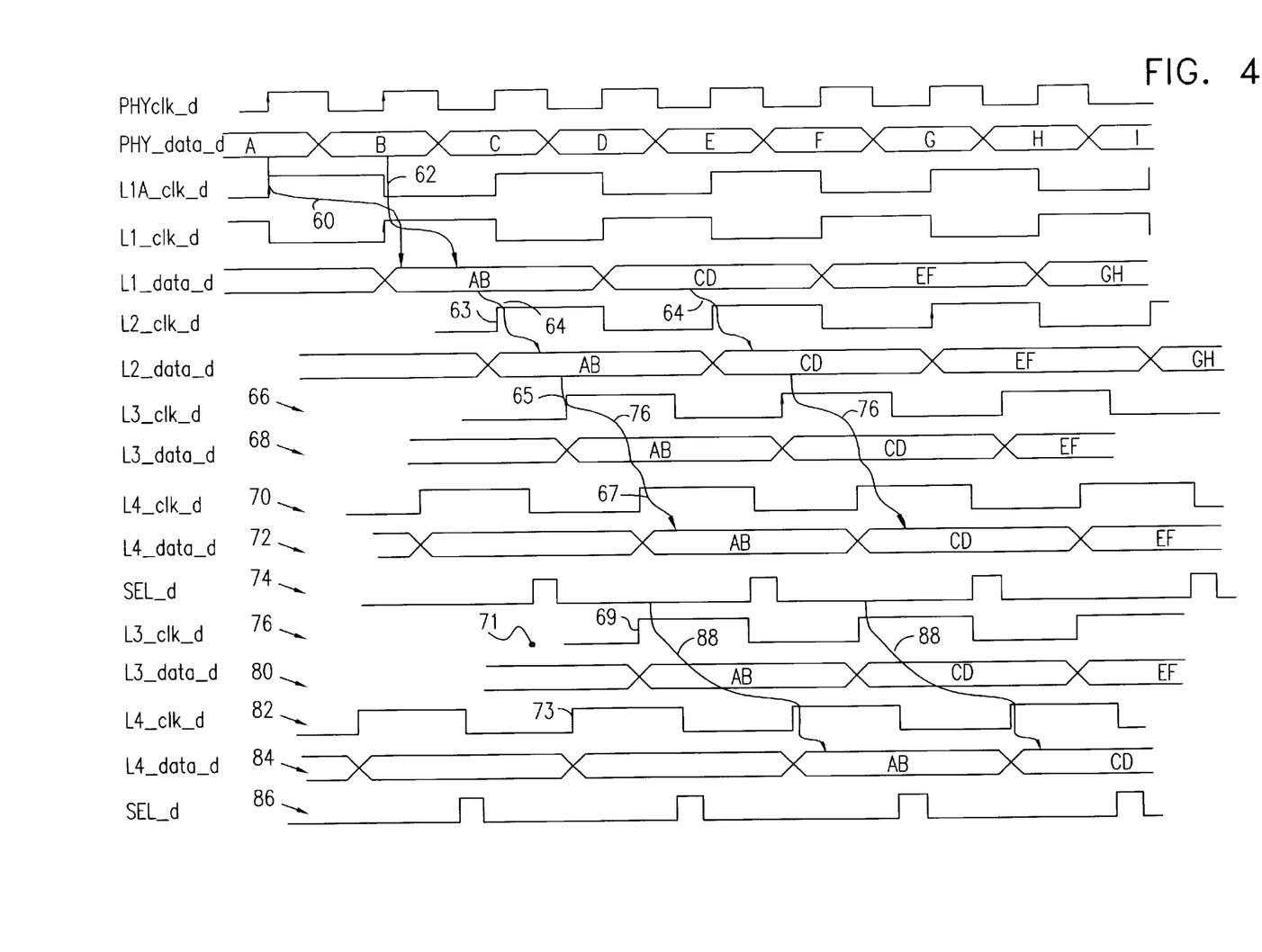
FIG. 4 is a schematic timing diagram showing signals received by and generated within the synchronizer of FIG. 3, according to a preferred embodiment of the present invention.

FIG. 3 is a schematic block diagram of synchronizer 12d, and FIG. 4 is a timing diagram showing signals received by and generated within synchronizer 12d, according to a preferred embodiment of the present invention. While the following description refers specifically to synchronizer 12d, substantially the same description applies to any of synchronizers 12 in system 22. Also in the following description, references are made to latches and their respective triggers. It is to be understood herein that a latch is a memory storage device which stores data input to the latch when triggered by a latch trigger, typically on a rising clock edge.

During operation of synchronizer 12d, the synchronizer receives a 25±0.01% MHz clock signal PHY_clk_d from its respective physical layer interface 10d. When interface 10d receives data from network device 13d, 4-bit data PHY_data_d, marked in FIG. 4 as A, B, C, D, ..., is input to synchronizer 12d. Clock signal PHY_clk_d is input to a trigger of a single-bit latch 26d. Latch 26d has its output coupled to an inverter 44d, and the output of inverter 44d is fed back to latch 26d, so that the combination of latch 26d and inverter 44d act as a frequency divide-by-two. Thus, latch 26d generates a 12.5 MHz clock L1a_clk_d as its output, and inverter 44d generates a 12.5 MHz clock 180° out of phase with L1a_clk_d, herein referred to as L1_clk_d.

L1_clk_d is applied to trigger an 8-bit data assembly latch 30d, and L1a_clk_d is applied to trigger a 4-bit temporary storage latch 28d. Thus 4-bit data PHY_data_d from interface 10d are alternately clocked directly into latch 30d and indirectly via latch 28d to latch 30d, as shown by respective arrows 60 and 62 (FIG. 4) for data A and B. Data are thus stored sequentially as a plurality of bytes L1_data_d, shown in FIG. 3 as AB, CD, EF, . . . , in latch 30d.

The L1_data_d bytes in latch 30d are sequentially transferred out of latch 30d to a first synchronizing latch 32d, which acts as an input buffer, as shown by arrows 64, in which latch the data is stored as L2_data_d. Latch 32d is triggered by a clock signal L2_clk_d generated by a controller 38d. Controller 38d begins generating L2_clk_d when physical interface 10d begins sending data to synchronizer 12d, by evaluating a phase φ(L1_d) of clock L1_clk_d. The phase of clock L2_clk_d is then set according to the equation:

$$\phi(L2\_d) = \phi(L1\_d) + 180° \quad (1)$$

The frequency of L2_clk_d is set to be equal to that of clock L1_clk_d. It will be appreciated that the triggers of latches 26d, 28d, 30d, and 32d are all synchronized to clock signals derived from the one physical interface clock signal PHY_clk_d, so that L1_data_d are clocked into and out of latch 30d, and L2_data_d are clocked into latch 32d, at a rate directly dependent on the interface clock signal.

L2_data_d is then clocked from latch 32d into a second synchronizing latch 34d, as L3_data_d, and L3_data_d is clocked into a third synchronizing latch 36d as L4_data_d. Latch 34d acts an intermediate buffer, and latch 36d acts as an output buffer.

Latches 34d and 36d are each triggered by respective clock signals L3_clk_d, and L4_clk_d, which signals are derived from external system clock CLK1 and from L2_clk_d. As explained hereinabove, external system clock CLK1 runs independently of the physical interface clock PHY_clk_d, most preferably at 125±0.01% MHz. L3_clk_d and L4_clk_d are generated in timing controller 38d, as described hereinbelow.

In addition to receiving as inputs L1_clk_d and CLK1, controller 38d also receives select signal SEL_d derived from CLK1, as described above with reference to FIG. 2.

When physical interface 10d initiates sending data to synchronizer 12d, a phase φ(SEL_d) of clock SEL_d is also evaluated by controller 38d, and a phase φ(L4_d) of clock L4_clk_d is set according to the equation:

$$\phi(L4\_d) = \phi(SEL\_d) + 180° \quad (2)$$

The frequency of L4_clk_d is set to be equal to that of clock SEL_d.

A phase φ(L3_d) of clock L3_clk_d is set according to one of the following equations:

$$\phi(L3\_d) = \left[\frac{\phi(L2\_d) + \phi(L4\_d)}{2}\right] \quad (3a)$$

$$\phi(L3\_d) = \left[\frac{\phi(L2\_d) + \phi(L4\_d)}{2}\right] + 180° \quad (3b)$$

Which of equations (3a) or (3b) is used is decided according to the following criteria:
If φ(L4_d)−φ(L2_d)≧180° equation (3a) is used; or if φ(L4_d)−φ(L2_d)<180° equation (3b) is used.

The frequency of L3_clk_d is set to be equal to that of clock SEL_d.

Thus the frequencies of clock signals L1_clk_d and L2_clk_d are the same, the signals only differing in phase. Similarly, the frequencies of clock signals L3_clk_d and L4_clk_d are the same (but different from the frequencies of L1_clk_d and L2_clk_d), the signals again only differing in phase.

Figure 5A:
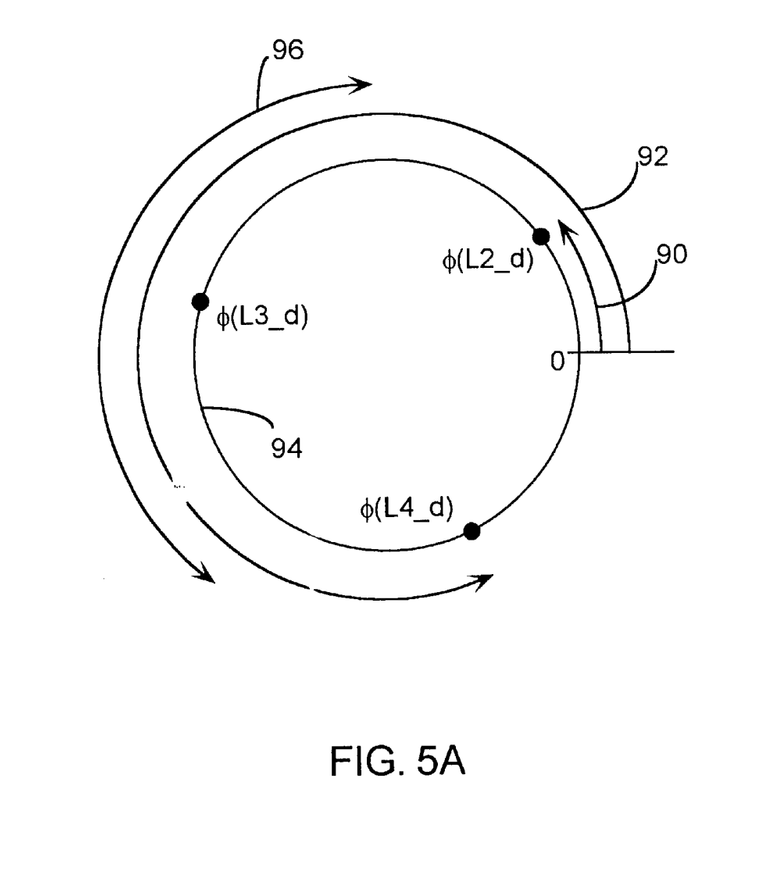
FIG. 5a and FIG. 5b are schematic phase diagrams illustrating a relationship between phases of clocks of the synchronizer of FIG. 3, according to a preferred embodiment of the present invention.
Figure 5B:
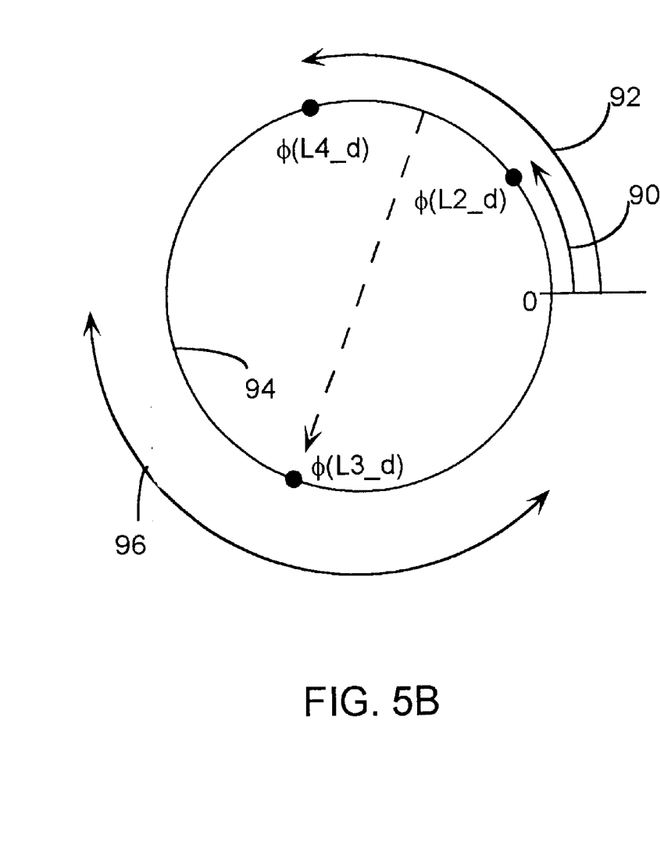

FIGS. 5a and FIGS. 5b are schematic phase diagrams illustrating the relationship between phases of clocks L2_clk_d, L3_clk_d, and L4_clk_d, according to a preferred embodiment of the present invention. When physical interface 10d begins sending data to synchronizer 12d, controller 38d measures phase φ(L2_d) and φ(L4_d), shown respectively by arcs 90 and 92. Controller 38d evaluates the expression φ(L4_d)−φ(L2_d), and if, as is shown in FIG. 5a, the expression is greater than 180°, phase φ(L3_d) of clock L3_clk_d is set to be the mean of φ(L2_d) and φ(L4_d), corresponding to equation (3a). If, as is shown in FIG. 5b, φ(L4_d)−φ(L2_d) is less than 180°, phase φ(L3_d) is set to be the mean of φ(L2_d) and φ(L4_d) plus 180°, corresponding to equation (3b). In both cases phase φ(L3_d) is on a major arc 94, and so the phase difference between φ(L3_d) and φ(L4_d) is at least 90°. Similarly, the phase difference between φ(L3_d) and φ(L2_d) is at least 90°.

As a packet of data is transferred through synchronizer 12d, phase φ(L3_d) moves relative to φ(L2_d), since clocks L3_clk_d and L2_clk_d are asynchronous. As stated above, however, the constraints on packet size and clock frequency tolerance mean that the largest deviation that can occur during one package is 1518×0.02%, i.e. 30.36%. Thus the maximum phase deviation that can occur during the transfer of a package through synchronizer 12d is 30.36%×360°=109°, shown by an arc 96. It will be noted that arc 96 is completely contained within arc 94. Thus, by using the criteria stated with respect to equations (3a) and (3b) to choose the initial placement of φ(L3_d), there can be no overlap of phase φ(L3_d) with φ(L2_d) or φ(L4_d) during the passage through synchronizer 12d of a complete package. Furthermore, synchronizer 12d operates with a large built-in margin of error, since while major arc 94 can never be less than 180°, the maximum size of arc 96 is 190°.

Returning to FIG. 4, arrows 66, 68, 70, 72, and 74 point to signals generated when φ(L4_d)−φ(L2_d)>180°, corresponding to FIG. 5a and equation (3a) above. Arrow 74 indicates clock signals SEL_d which are used by controller 38d to generate L4_clk_d, indicated by arrow 70, as 180° out of phase with SEL_d. Since φ(L4_d)−φ(L2_d)>180°, controller 38d sets the phase of clock signal L3_clk_d to be the mean of φ(L4_d) and φ(L2_d), i.e., a rising edge 65 of L3_clk_d is set at a mid-point of a rising edge 63 of L2_clk_d and a rising edge 67 of L4_clk_d. Lines 76 show the transfer of bytes AB and CD from latch 32d as L2_data_d, to latch 34d as L3_data_d, and then to latch 36d as L4_data_d.

Arrows 78, 80, 82, 84, and 86 point to signals generated when φ(L4_d)−φ(L2_d)<180°, corresponding to FIG. 5b and equation (3b) above. Arrow 86 points to clock signals SEL_d which are used by controller 38d to generate L4_clk_d, indicated by arrow 82, as 180° out of phase with SEL_d. Since φ(L4_d)−φ(L2_d)<180°, controller 38d sets the phase of clock signal L3_clk_d to be 180° ahead of the mean of φ(L4_d) and φ(L2_d), i.e., a rising edge 69 of L3_clk_d is set 180° ahead of a mid-point 71 of a rising edge 63 of L2_clk_d and a rising edge 73 of L4_clk_d. Lines 88 show the transfer of bytes AB and CD from latch 32d as L2_data_d, to latch 34d as L3_data_d, and then to latch 36d as L4_data_d.

The select times of SEL_d are used by multiplexer 14 to clock signals from latch 36d into the multiplexer. Signals indicated by arrow 72 and arrow 74 show that the select times of SEL_d are centered on their respective data signals L4_data_d when φ(L4_d)−φ(L2_d)>180°. Similarly, signals indicated by arrow 84 and arrow 86 show that the select times of signal SEL_d are centered on their respective data signals L4_data_d when φ(L4_d)−φ(L2_d)<180°. Since data signals L4_data_d are synchronous with clock signal L4_clk_d, and since select signal SEL_d is also synchronous with signal L4_clk_d, data signals L4_data_d remain synchronous with select signal SEL_d for the duration of the package of PHY_data_d generating L4_data_d.

In a manner substantially as described hereinabove for synchronizer 12d, synchronizers 12a, 12b, 12c, 12e, 12f, 12g, and 12h generate respective data signal packets, each signal of each packet being synchronized with respective select signal SEL_a, SEL_b, SEL_c, SEL_e, SEL_f, SEL_g, and SEL_h. Since all of the select signals are synchronized to the external system clock, all of the data from physical interfaces 10 will be synchronized to the external clock. Furthermore, since each of the select signals is delayed so that only one select signal is set at any instant in time, data from physical interfaces 10 are clocked into multiplexer 14 synchronously and without conflict. Thus, multiplexer 14 is able to transfer all data from the low data-rate physical interfaces into a high data-rate network.

One of the factors involved in the cost of hardware devices comprising integrated circuits is the number of external pins used by the circuits. As the pin count increases, so does the cost of producing the device, so that there is an incentive to produce devices with lower pin counts. System 22, when implemented as an integrated circuit, leads to a significant reduction in overall pin count by comparison with solutions known in the art. For example, multiplexer 14 uses approximately 12 pins to feed 8-bit data-words to the high data-rate network, and the multiplexer can multiplex up to ten physical interfaces. If the ten physical interfaces were fed directly into the high data rate network, then of the order of 120 pins would be needed.

While in the preferred embodiments described hereinabove, eight synchronizers having eight associated physical interfaces are shown, it will be understood that up to ten synchronizers may be used in system 22 to multiplex up to ten associated interfaces. It will also be understood that while system 22 uses select signals having a select time of 8 ns, select signals with different select times can be generated in order to accommodate different numbers of synchronizers and associated physical interfaces. For example, using a select time of 4 ns enables system 22 to accommodate up to 20 interfaces. Although these preferred embodiments relate specifically to multiplexing of Fast Ethernet signals onto a Gigabit Ethernet line, the principles of the present invention may be applied in a straightforward manner to interfacing and multiplexing between other networks and standards as well, with greater or smaller numbers of physical interfaces from input networks.

While the preferred embodiments described above use the same nominal clock rates for data input to all of the plurality of synchronizers, synchronizers wherein the nominal data input clock rates of different input channels are different from one another are also within the scope of the present invention. Furthermore, those skilled in the art will be able to devise synchronizers within the scope of the present invention using fewer latches for each channel than the three synchronizing latches of the preferred embodiments described above, although such synchronizers may have a smaller margin of error than synchronizers with three synchronizing latches.

It will be appreciated that the preferred embodiments described above are cited by way of example, and the full scope of the invention is limited only by the claims.

What is claimed is:

1. Apparatus for multiplexing electronic data-words provided by a plurality of input sources operating in accordance with respective input clocks, which may be mutually asynchronous, to a common output operating in accordance with a system clock, the apparatus comprising:
   delay circuitry, which generates a plurality of select signals responsive to the system clock, corresponding respectively to the plurality of input sources;
   a plurality of synchronizers respectively associated with the plurality of input sources, each synchronizer comprising a series of memory buffers through which data-words from the respective input source are transferred, the series of memory buffers comprising at least:
      an input buffer, which receives the data-words from the respective input source in accordance with the respective input clock; and
      an output buffer, which provides the data-words for output in accordance with the corresponding select signal; and
   a multiplexer which receives the data-words from the output buffers of the plurality of synchronizers responsive to the respective select signals, and which combines the data-words into the common output in accordance with the system clock.

2. Apparatus according to claim 1, wherein each series of memory buffers comprises an intermediate buffer which receives the data-words from the corresponding input buffer and which transfers the data-words to the corresponding output buffer responsive to the corresponding select signal.

3. Apparatus according to claim 2, wherein the intermediate buffer transfers the data-words to the corresponding output buffer at a time determined by a corresponding intermediate phase which is a function of a phase of the corresponding select signal and a phase of the corresponding input clock.

4. Apparatus according to claim 3, wherein the corresponding intermediate phase is a mean of the phase of the corresponding select signal and the phase of the corresponding input clock when a difference between the phase of the corresponding select signal and the phase of the corresponding input clock is greater than or equal to 180°, and wherein the corresponding intermediate phase is the mean plus 180° when the difference between the phase of the corresponding select signal and the phase of the corresponding input clock is less than 180°.

5. Apparatus according to claim 2, wherein each synchronizer comprises a controller which generates respective clock signals to control transfer of the data-words from the corresponding input buffer and the corresponding intermediate buffer and the corresponding output buffer responsive to the corresponding select signal and the corresponding input clock and the system clock.

6. Apparatus according to claim 1, wherein the delay circuitry generates a sequence of synchronizing pulses each of which is applied to the plurality of synchronizers during a time period when the data-words are not being received from the output buffers, so as to zero out clock drift.

7. Apparatus according to claim 6, wherein the delay circuitry generates the synchronizing pulses within a period which is a function of a nominal asynchrony of the plurality of input clocks, so that the output data-words and corresponding input data-words differ in phase by no more than a predetermined maximum phase deviation.

8. Apparatus according to claim 6, wherein the multiplexer is coupled to transfer the common output to a packet-switched network, and wherein the sequence of synchronizing pulses is generated responsive to a packet synchronization signal in the network.

9. Apparatus according to claim 1, wherein the common output comprises an output which operates in accordance with a Gigabit Ethernet standard, and wherein the plurality of input sources comprises at least some input sources which operate in accordance with a Fast Ethernet standard.

10. Apparatus according to claim 9, wherein each of the synchronizers that is coupled to receive input in accordance with the Fast Ethernet standard comprises a data assembly buffer, in which two four-bit data-words are combined into one eight-bit data-word for output in accordance with the Gigabit Ethernet standard.

11. Apparatus according to claim 1, wherein the plurality of select signals comprises a sequence of select signals such that a respective select signal in the sequence is provided to each of the plurality of synchronizers.

12. Apparatus according to claim 1, wherein the memory buffers comprise latches arranged to transfer data from one to another in sequence and mutually clocked so that each data-word received by a given one of the latches is transferred to the next latch in the sequence before the given latch receives the next data-word.

13. A method for multiplexing a plurality of electronic data-words provided by a plurality of input sources operating in accordance with respective input clocks, which may be mutually asynchronous, to a common output operating in accordance with a system clock, the method comprising:

generating a plurality of select signals responsive to the system clock, corresponding respectively to the plurality of input sources;

receiving the data-words from the input source in respective input buffers in accordance with the respective input clocks;

conveying the data-words in the input buffers to corresponding output buffers such that the data-words are available for output from the output buffers in accordance with the respective select signals; and multiplexing the data-words from the output buffers responsive to the select signals so as to provide the common output responsive to the system clock.

14. A method according to claim 13, wherein conveying the data-words comprises conveying the data-words from the input buffers to respective intermediate buffers which transfer the data-words to the corresponding output buffers responsive to the respective select signals.

15. A method according to claim 14, wherein conveying the data-words comprises generating an intermediate clock phase at which the data-words are to be transferred by the intermediate buffers as a mean of a phase of the corresponding select signal and a phase of the corresponding input clock when a difference between the phase of the corresponding select signal and the phase of the corresponding input clock is greater than or equal to 180°, and generating each of the corresponding phases as the mean plus 180° when the difference between the phase of the corresponding select signal and the phase of the corresponding input clock is less than 180°.

16. A method according to claim 13, and comprising generating a sequence of synchronizing pulses each of which is applied to the plurality of synchronizers during a time period when the data-words are not being received from the output buffers, so as to zero out clock drift.

17. A method according to claim 13, wherein generating the sequence of synchronizing pulses comprises generating the pulses with a period which is a function of a nominal asynchrony of the plurality of input clocks, so that the output data-words and corresponding input data-words differ in phase by no more than a predetermined maximum phase deviation.

18. A method according to claim 13, wherein multiplexing the data-words comprises outputting the data-words in accordance with a Gigabit Ethernet standard, and wherein receiving the data-words comprises receiving the data-words from at least some input sources operating in accordance with a Fast Ethernet standard.

19. A method according to claim 13, wherein generating the plurality of select signals comprises generating a sequence of select signals such that a respective select signal in the sequence is provided to each of the plurality of synchronizers.

* * * * *